(12) United States Patent
Tiedemann, Jr. et al.

(10) Patent No.: US 6,985,728 B2
(45) Date of Patent: Jan. 10, 2006

(54) APPARATUS AND METHOD FOR REDUCING MESSAGE COLLISION BETWEEN MOBILE STATIONS SIMULTANEOUSLY ACCESSING A BASE STATION IN A CDMA CELLULAR COMMUNICATIONS SYSTEM

(75) Inventors: Edward G. Tiedemann, Jr., San Diego, CA (US); Lindsay A. Weaver, Jr., San Diego, CA (US); Roberto Padovani, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 55 days.

(21) Appl. No.: 10/457,962

(22) Filed: Jun. 10, 2003

(65) Prior Publication Data

US 2003/0199252 A1    Oct. 23, 2003

Related U.S. Application Data

(63) Continuation of application No. 08/588,149, filed on Jan. 18, 1996, now Pat. No. 6,615,050, which is a continuation of application No. 08/219,867, filed on Mar. 30, 1994, now Pat. No. 5,544,196, which is a continuation of application No. 07/847,152, filed on Mar. 5, 1992, now abandoned.

(51) Int. Cl.
*H04Q 7/20* (2006.01)
*H04B 1/69* (2006.01)

(52) U.S. Cl. ................... 455/434; 455/450; 375/145; 370/515

(58) Field of Classification Search ............... 455/434, 455/450, 452.1, 453, 515, 516; 370/321, 370/345, 347, 515, 442; 701/219; 375/130, 375/140, 145, 146, 147
See application file for complete search history.

(56) References Cited

U.S. PATENT DOCUMENTS 5,243,530 A * 9/1993 Stanifer et al. ............. 701/219
6,535,736 B1 * 3/2003 Balogh et al. .............. 455/434

* cited by examiner

*Primary Examiner*—Quochien B. Vuong
(74) *Attorney, Agent, or Firm*—Philip R. Wadsworth; Thien T. Nguyen; Kam T. Tam

(57) ABSTRACT

Collisions between messages simultaneously transmitted by multiple spread-spectrum transmitters are reduced by distributing the transmissions over the available resources of the receiver. Each mobile station in a CDMA system uses one or more randomization methods to distribute its transmissions. In the first randomization, the mobile station time-delays its transmissions by a number of chips of the PN code with which it spreads the transmitted signal. In a second randomization, the mobile station randomly selects the PN code. In a third randomization, the mobile station inserts a random delay between successive message transmissions or probes if it does not receive an acknowledgement after a predetermined timeout period. A predetermined number of such transmissions is called a probe sequence. In a fourth randomization, the mobile station inserts a relatively long random delay between successive probe sequences if it does not receive an acknowledgement of any probe in the sequence.

24 Claims, 5 Drawing Sheets

APPARATUS AND METHOD FOR REDUCING MESSAGE COLLISION BETWEEN MOBILE STATIONS SIMULTANEOUSLY ACCESSING A BASE STATION IN A CDMA CELLULAR COMMUNICATIONS SYSTEM

CLAIM OF PRIORITY UNDER 35 U.S.C. §120

The present Application for Patent is a Continuation and claims priority to patent application Ser. No. 08/588,149 entitled "APPARATUS AND METHOD FOR REDUCING MESSAGE COLLISION BETWEEN MOBILE STATIONS SIMULTANEOUSLY ACCESSING A BASE STATION IN A CDMA CELLULAR COMMUNICATIONS SYSTEM," filed Jan. 18, 1996, now U.S. Pat. No. 6,615,050, which is a Continuation of patent application Ser. No. 08/219,867, filed Mar. 30, 1994, now U.S. Pat. No. 5,544,196, filed Mar. 5, 1992, which is a continuation of patent application Ser. No. 07/847,152, filed Mar. 5, 1992, now abandoned, all assigned to the assignee hereof and hereby expressly incorporated by reference herein.

BACKGROUND

The present invention relates to cellular telephone systems. More specifically, the present invention relates to a system for increasing the reliability of the cellular telephone system in environments having substantial multipath propagation or under conditions wherein a large number of mobile telephone units simultaneously attempt to access a base station.

Many communications systems have multiple transmitters that need to randomly access one or more receivers. A local area network (LAN) is one example of such a multi-access system. A cellular telephone system is another. In any such system, when several transmitters attempt to transmit simultaneously, the messages may interfere or "collide" with one another. A receiver cannot distinguish among the messages involved in the collision.

Two such multiaccess protocols, commonly called the "Aloha" and "Slotted Aloha" protocols, are described in Bertsekas et al., *Data Networks*, chapter 4, Prentice-Hall, Englewood Cliffs, 1987. In the Aloha protocol, each transmitter may transmit a message at any time. Upon discovering that the transmitted message has collided, the transmitter waits a random delay time and retransmits the message. In Slotted Aloha, all messages fit into a time slot of a predetermined length. Upon discovering that the transmitted message has collided, the transmitter delays a random number of slots and then retransmits the message. In both methods, a random delay is introduced to prevent transmitters from retransmitting simultaneously.

The use of code division multiple access (CDMA) modulation is one of several techniques for facilitating communications in which a large number of system users are present. The use of CDMA techniques in a cellular telephone system is disclosed in U.S. Pat. No. 5,056,109 entitled "Method and Apparatus for Controlling Transmission Power in a CDMA Cellular Telephone System" and in U.S. patent application Ser. No. 07/543,496 entitled "System and Method for Generating Signal Waveforms in a CDMA Cellular Telephone System," now U.S. Pat. No. 5,103,459, both assigned to the assignee of the present invention and incorporated herein by reference.

In the above-mentioned patents, a multiple access technique is disclosed where a large number of mobile stations, each having a transceiver, communicate through base stations, also known as cell-sites, using CDMA spread spectrum communication signals. The base stations are connected to a mobile telephone switching office (MTSO), which in turn is connected to the public switched telephone network (PSTN).

The use of CDMA spread-spectrum techniques maximizes the number of mobile stations that can communicate simultaneously with the base station because the same frequency band is common to all stations. Each mobile has a pseudonoise (PN) code uniquely associated with it that the mobile station uses to spread its transmitted signal. In the above-referenced patent, this PN code is called the "long PN code." Once the call has been initiated, i.e., the base station has selected the long PN code corresponding to the transmitting mobile station, the base station can receive and de-spread the signal transmitted by the mobile station. Similarly, the mobile station can receive and de-spread the signal transmitted by the base station. In some systems, the signals may be modulated with a "pilot" PN code as well.

However, for certain types of transmissions, it is advantageous to use a common PN long code, rather than a unique long code for each mobile station. The message transmitted by a mobile station attempting to initiate a call is one example of such a transmission. A mobile station wishing to initiate calls can transmit such requests on a common "access channel" using a corresponding common PN code. The base station can monitor the access channel by despreading the signal using this PN code. The access channel is used because messages such as those for initiating a call are relatively short in comparison to voice transmissions, and a receiver could more easily monitor a relatively few access channels than the large number of unique "traffic channels" with which the mobile stations are associated by their unique PN long codes.

The access channel may be used by the mobile station not only to initiate a call, but to transmit any information to the base station at a time other than during a call that has already been initiated. For example, the access channel may be used by the mobile station to respond to an incoming call initiated by a base station over a "paging channel."

Under any of the conditions discussed above, multiple mobile stations may transmit simultaneously on the access channel. When two mobile stations transmit simultaneously and there is no multipath, the transmissions arrive at the base station separated in time by a delay equal to the difference of twice the distance between each mobile station and the base station. Under most operating conditions, it is unlikely that a large number of mobile stations will be at precisely equal distances from the base stations. However, simultaneously transmitted messages would collide if two or more stations are at the same range. Under most conditions, the base station can distinguish among the transmissions because the time between arrivals of the transmissions at the base station exceeds one PN chip.

Some operating conditions tend to produce collisions. Collisions are likely to occur when a large number of mobile stations approach the edge of a cell simultaneously, a condition causing handoffs of the mobile stations. The access channel transmissions arrive at the base station simultaneously because the mobile stations are at substantially the same distance from the base station when at the edge of the cell.

It is also possible that a large number of mobile users would attempt to simultaneously initiate calls for other reasons such as following a natural disaster. The simultaneous transmissions of multiple mobile stations on the access channel may exceed the maximum throughput of the processor in the base station.

The probability of access channel collisions increases with an increase in the number of mobile stations and with an increase in multipath reflections. Multipath compounds the problem because, while the main signals of two transmissions may be separated in time by more than one chip, multipath components of the transmissions may not be. Furthermore, as discussed in U.S. Pat. No. 5,109,390, issued Apr. 29, 1992, a base station diversity receiver may have multiple correlators that, combine received multipath components to improve message quality. However, ambiguities may exist between multipath components that would reduce the effectiveness of the diversity receiver. These problems and deficiencies are clearly felt in the art and are solved by the present invention in the manner described below.

SUMMARY

The present invention reduces interference between multiple spread-spectrum transmitters operating simultaneously and improves distribution of the transmissions among the available resources of the receiver. The present invention is generally applicable to any communication system having multiple transmitters attempting uncoordinated communication with a receiver, including local area networks. In an illustrative embodiment of the present invention, the transmitters are mobile stations transmitting on an access channel and the receiver is a base station in a CDMA cellular communications network.

Each mobile station uses one or more randomization methods for its access channel transmissions. The randomizations have the effect of separating the transmissions to reduce collisions. The first randomization separates the access channel signals by adding a random time delay to each signal and the second randomization separates them by randomly changing the direct sequence spreading of each signal.

In the first randomization, called "PN randomization," the mobile station time-delays its access channel transmissions by a small amount that is greater than or equal to one chip but is much less than the length of the message itself. In contrast, a non-spread-spectrum communication system using a slotted aloha protocol must, upon a collision, typically wait to receive an acknowledgement of a transmission. If a collision occurs, typically detected by not receiving an acknowledgement, the mobile station must wait a random delay, typically several slots before retransmitting the message. Because the present invention addresses spread-spectrum systems, collisions are naturally reduced by the range difference described above and even more by adding the PN random delay which is typically much less than a slot length.

Although true randomization would be ideal, a pseudorandom method is used so that the base station can obtain the value of the delay used by the mobile station, which it requires to demodulate the transmission. The PN randomization delay may be pseudorandomly produced using a hash algorithm to which a number uniquely associated with that mobile station is provided. The input number may be the station's electronic serial number (ESN). A further advantage of a pseudorandom method for calculating the PN randomization delay is that the base station, knowing the amount of delay added by a mobile station, may more quickly acquire a signal that the mobile station subsequently transmits on a traffic channel.

PN randomization may be understood in the context of a scenario involving a number of mobile stations simultaneously transmitting at the edge of a cell, i.e., equally distant from the base station. In such a scenario, PN randomization increases the effective distance from each mobile station to the base station by a random amount.

Multipath significantly increases the difficulty experienced by a base station in distinguishing the signals simultaneously transmitted by different mobile stations. The small PN randomization delay may not be enough to separate the multipath components, which would otherwise be used by a base station diversity receiver to improve reception in multipath environments.

A second randomization, called "channel randomization," may be used to improve transmission quality in such a multipath environment. As discussed in the above-referenced patents, the CDMA transmitter spreads its signal using a PN code and the CDMA receiver demodulates the received signal using a local replica of the PN code. In channel randomization, the mobile station randomly changes the PN code with which it spreads the access channel signal. Changing the PN code effectively creates a larger number of access channels. The base station has a receiver that corresponds to each possible access channel. Even in the presence of multipath, the base station can distinguish simultaneous transmissions on different access channels.

When channel randomization is used, the base station may send the mobile station a parameter representing the maximum number of access channels, i.e., the maximum number of different PN codes, that it can receive. The base station transmits this maximum access channel parameter to the mobile station during periodic communications of system information or "overhead" between the base station and a mobile station.

A base station may not be able to distinguish among simultaneous transmissions if it receives more such transmissions than it has access channels. For that reason, mobile stations may use a third randomization called "backoff randomization" and a fourth randomization called "persistence" in addition to PN randomization and channel randomization.

Each transmission on an access channel-by a mobile station attempting to communicate with a base station is called a "probe." If the base station successfully distinguishes and receives the probe, it transmits an acknowledgement to the mobile station. If the mobile station does not receive an acknowledgement to its probe after a predetermined timeout period, it attempts another probe. A predetermined number of such probes is called an "access probe sequence." The entire access probe sequence may be repeated multiple times if the mobile station does not receive an acknowledgement of any probe in the sequence.

In backoff randomization, the mobile station inserts a random delay between successive probes. Before beginning a probe, the mobile station generates a random number in a predetermined range and delays the probe by an amount proportional to the random number.

In persistence, the mobile station inserts a random delay before each access probe sequence. Before beginning an access probe sequence, the mobile station compares a randomly generated number to a predetermined persistence parameter. The persistence parameter is a probability that is used to determine whether an access probe sequence will or will not occur. The mobile station begins the access probe sequence only if the random number is within a range of numbers determined by the persistence parameter. If persistence is used, the mobile station performs the test at predetermined intervals until the test passes or until a probe is acknowledged.

Finally, if the mobile station does not receive an acknowledgment to any probes within a predetermined number of access probe sequences, it may abandon the attempt.

In a cellular telephone system, a mobile station uses the access channels for any non-voice transmissions to the base station. The mobile station may, for example, request communication with the base station when the mobile user initiates a call. The mobile station may also respond on the access channel to a transmission from the base station to acknowledge an incoming call. In the latter situation, the base station can schedule its transmissions on the paging channel to more efficiently handle the responses from the mobile stations, which may be expected to occur within a certain time period. Because the base station has some control over the situation, the mobile stations are not required to use persistence for transmitting responses.

Mobile stations may further reduce interference with each other by transmitting with the minimum power necessary for their signals to be received by the base station. A mobile station transmits its first probe at a power level somewhat less than it estimates to be necessary to reach the base station. This conservative estimate may be a predetermined value or it may be calculated in response to the measured power level of a signal that the mobile station has or is receiving from the base station. A preferred embodiment is for the mobile station to measure the received power from the base station. This received power is the transmitted power of the base station times the path loss. The mobile station then uses this estimate, plus a constant correction, plus adjustment factors to set the initial transmit power. These adjustment factors may be sent to the mobile station from the base station. Some of these factors correspond to radiated power of the base station. Since the path loss from the mobile station to the base station is essentially the same as from the base station to the mobile station, the signal received at the base station should be at the correct level, assuming that the base station has supplied the appropriate correction factors. After transmitting the first access probe at this minimum power level, the mobile station increases the power of successive probes within each access probe sequence by a predetermined step amount.

The foregoing, together with other features and advantages of the present invention, will become more apparent when referring to the following specification, claims, and accompanying drawings.

BRIEF DESCRIPTION OF THE DRAWINGS

For a more complete understanding of the present invention, we now refer to the following detailed description of the embodiments illustrated in the accompanying drawings, wherein.

DETAILED DESCRIPTION

Figure 1:
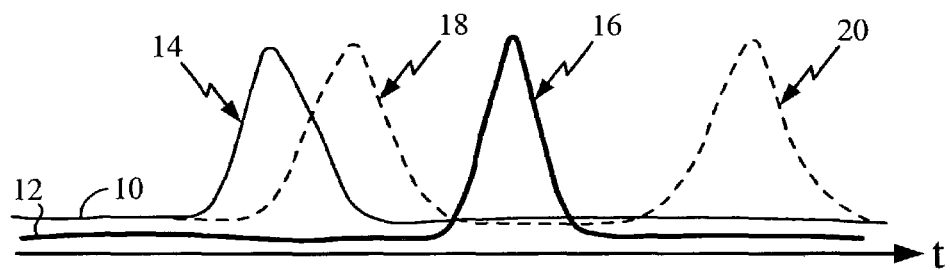
FIG. 1 is a timing diagram showing two spread spectrum signals that are despread by a single correlator at a base station receiver.

In FIG. 1, two access channel signals 10 and 12 are despread at a receiver (not shown), which produces respective correlation spikes 14 and 16. Signal 12 arrives shortly after signal 10 because, for example, the transmitter from which signal 12 emanates is further from the receiver than the transmitter from which signal 10 emanates. Signals 10 and 12 may be direct sequence spread spectrum signals of a CDMA cellular telephone system (not shown). In such an embodiment, the transmitters are access channel transmitters of mobile stations and the receiver is an access channel receiver of a base station.

If the difference between the arrival times of signal 10 and signal 12 at the base station receiver is less than one chip of the PN code with which they were modulated, the receiver may be unable to distinguish between signals 10 and 12. This may be true in FIG. 1 when, for example, the two mobile stations are less than 120 meters (m) apart and the access channel has a chip rate of 1.2288 megahertz (MHz). A collision is said to occur when the receiver cannot distinguish the signals.

Each mobile station uses "PN randomization" to reduce the probability of a collision between its transmitted signal and those of other mobile stations on the same access channel. In PN randomization, a first mobile station transmitter may delay signal 10 to the location of delayed signal 18 and a second mobile station transmitter may delay signal 12 to the location of delayed signal 20. A hash function is preferred for generating the delay because it enables the base station to determine the delay used by the mobile station. The base station can then calculate the range to the mobile station by measuring the total delay experienced by a message in arriving at the mobile station and subtracting the added PN randomization delay.

The hash function shown below (Equation 1) uses the electronic serial number (ESN) associated with the mobile station to produce the delay. The hash function produces a delay, RN, in the range of 0 to 512 chips of the PN code sequence generator that modulates the signal. Note that the maximum delay is much less than the delay provided by the other randomizations discussed below. The base station may provide a range index, PROBE_PN_RAN, to the mobile station during system initialization or at other times. The delay range, R, is defined as $_2$PROBE_PN_RAN $$RN = R \times ((40503 \times (L \approx H \approx D)) \mod 2^{16})/2^{16} \quad (1)$$

where:
R is the delay range;
L is the least significant 16 bits of the ESN;
H is the most significant 16 bits of the ESN;
D is a number 14 times the least significant 12 bits of the ESN;
⌊X⌋ represents the largest integer less than or equal to X;
⊕ represents a bitwise exclusive-OR operation; and all other operations are integer arithmetic.

Figure 2:
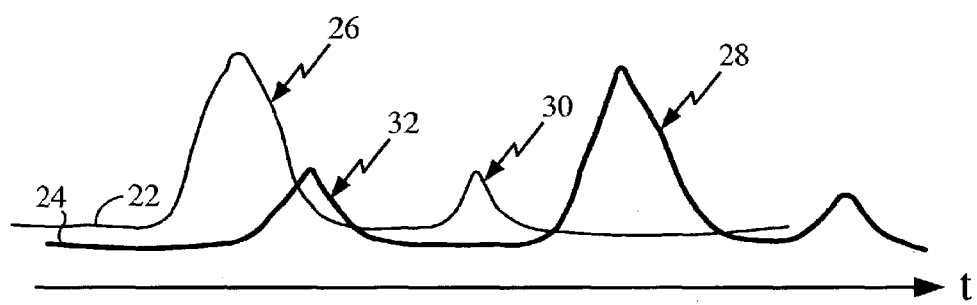
FIG. 2 is similar to FIG. 1 and shows the effect of multipath on the signals.

In FIG. 2, two access channel signals 22 and 24 are despread by a receiver correlator (not shown), which produces respective correlation spikes 26 and 28. As in FIG. 1, signal 24 arrives shortly after signal 22. Signals 22 and 24 are delayed using the method described above. The presence of multipath creates multipath correlation spikes 30 and 32 in signals 22 and 24 respectively. But for the presence of correlation spike 32 near correlation spike 26, a diversity base station receiver could combine spikes 26 and 30 to improve reception of signal 22. However, the receiver may not be able to distinguish signal 22 from signal 24 if multipath correlation spike 32 is received within one chip of correlation spike 26 or if multipath correlation spike 30 is received within one chip of correlation spike 28. If the spikes 26, 28, 30, and 32 occur very near one another, the receiver cannot determine which spike is associated with which signal and therefore cannot combine them. However, if a PN randomization delay of one or more chips is added, for example, to signal 24 then signal 24 will be shifted towards the right in FIG. 2 and correlation spike 32 will not interfere with correlation spike 26. A base station diversity receiver could then assume that multipath components occurring close to one another, such as spikes 26 and 30, are associated with the same transmitted signal 22 and could therefore be combined. Similarly, a base station receiver could assume that spikes 28 and 32 are associated with signal 24 and combine them. Such assumptions are valid because multipath delays are typically less than one chip.

Figure 3:
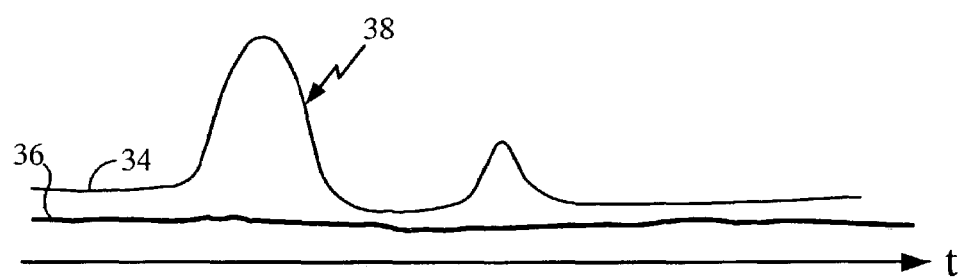
FIG. 3 is a timing diagram showing two spread spectrum signals that are despread by separate correlators at a base station receiver.

In FIG. 3, two access channel signals 34 and 36 are despread by two separate receiver correlators (not shown). Two mobile station transmitters (not shown) use "channel randomization" to modulate their respective signals 34 and 36 respectively with different PN codes, thereby requiring the base station receiver to use different correlators to demodulate them. Although signals 34 and 36 share the same frequency band, they are said to occupy different access channels because they are modulated using different PN codes. The receiver despreads signal 34 using the PN code corresponding to a first access channel and produces correlation spike 38, but signal 36 appears as noise to the receiver. This property, which allows a receiver to distinguish between signals 34 and 36 even in the presence of multipath, is well-known in spread spectrum communications. For each access channel that a base station receiver can receive simultaneously with other access channels, the base station must have a receiver that uses a PN code corresponding to that access channel.

In channel randomization, the transmitter randomly selects an access channel from a predetermined range, ACC_CHAN. The base station may provide this ACC_CHAN to the mobile station during system initialization or at other times during operation. Although the number of access channels from which a mobile station may choose is limited by hardware considerations and system throughput, a maximum of 32 is preferred.

Even if PN randomization and channel randomization are used, message collisions may occur if more than one transmitter selects the same access channel and transmits a message on it at the same time. The transmitters may use "backoff randomization" and "persistence" to further spread the messages over time to reduce collisions. The delays produced by the latter randomizations are much larger than that produced by PN randomization. The latter methods, as well as PN randomization and channel randomization, are discussed below with reference to the timing diagram shown in FIG. 4, the system shown in FIG. 5, and the flowchart shown in FIGS. 6A–6B.

Figure 5:
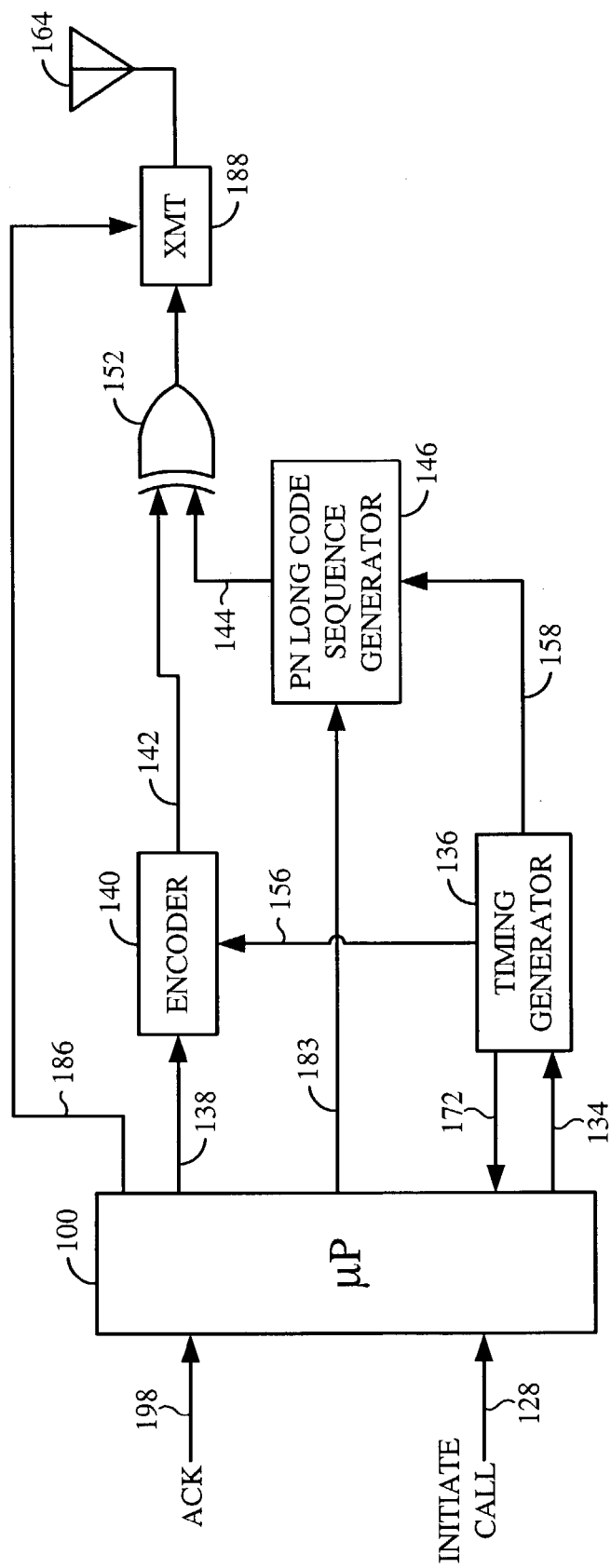
FIG. 5 shows a preferred embodiment of a mobile station access channel transmitter.
Figure 6A:
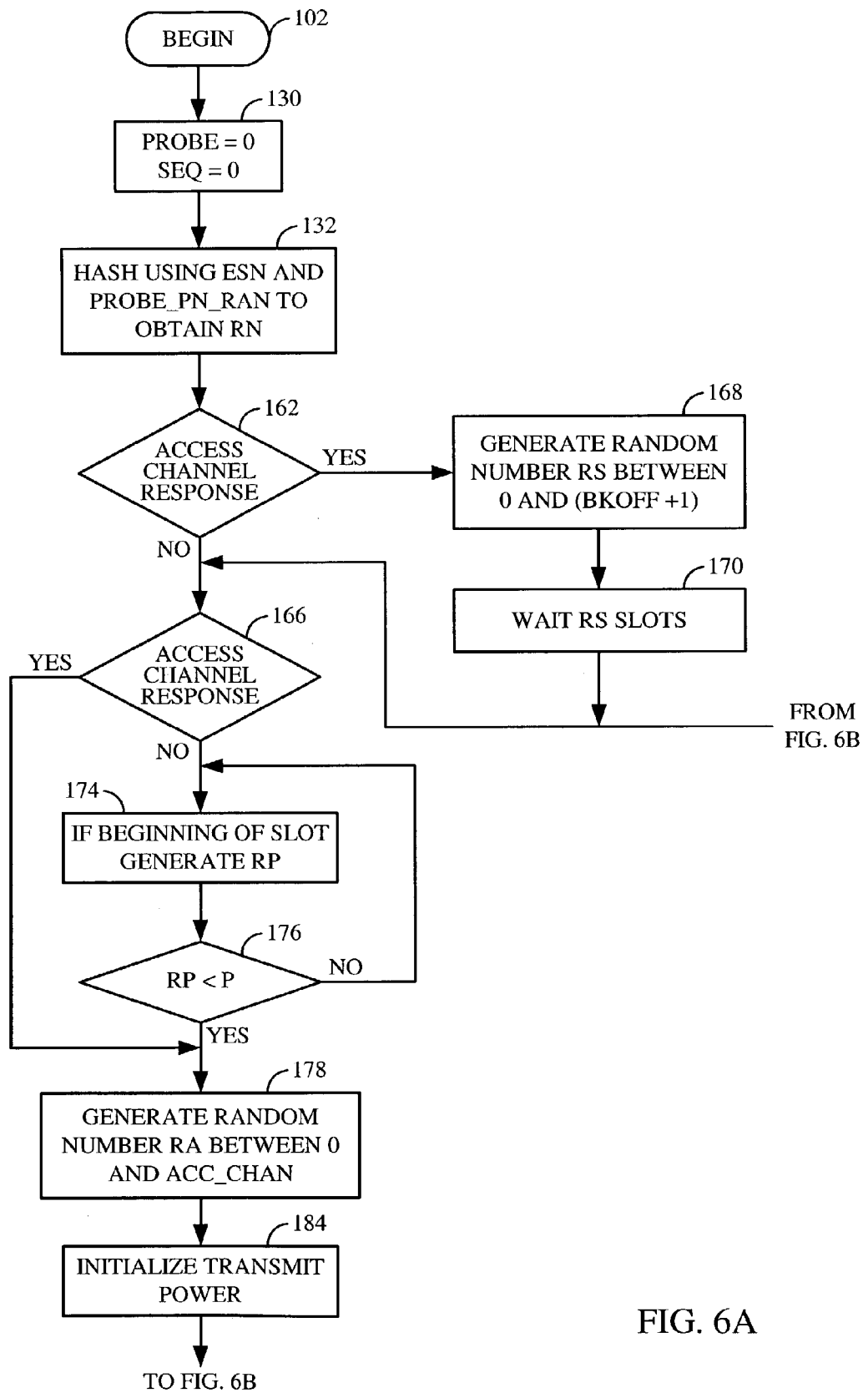
FIGS. 6A–6B is a flow chart showing the randomization methods of the present invention.
Figure 6B:
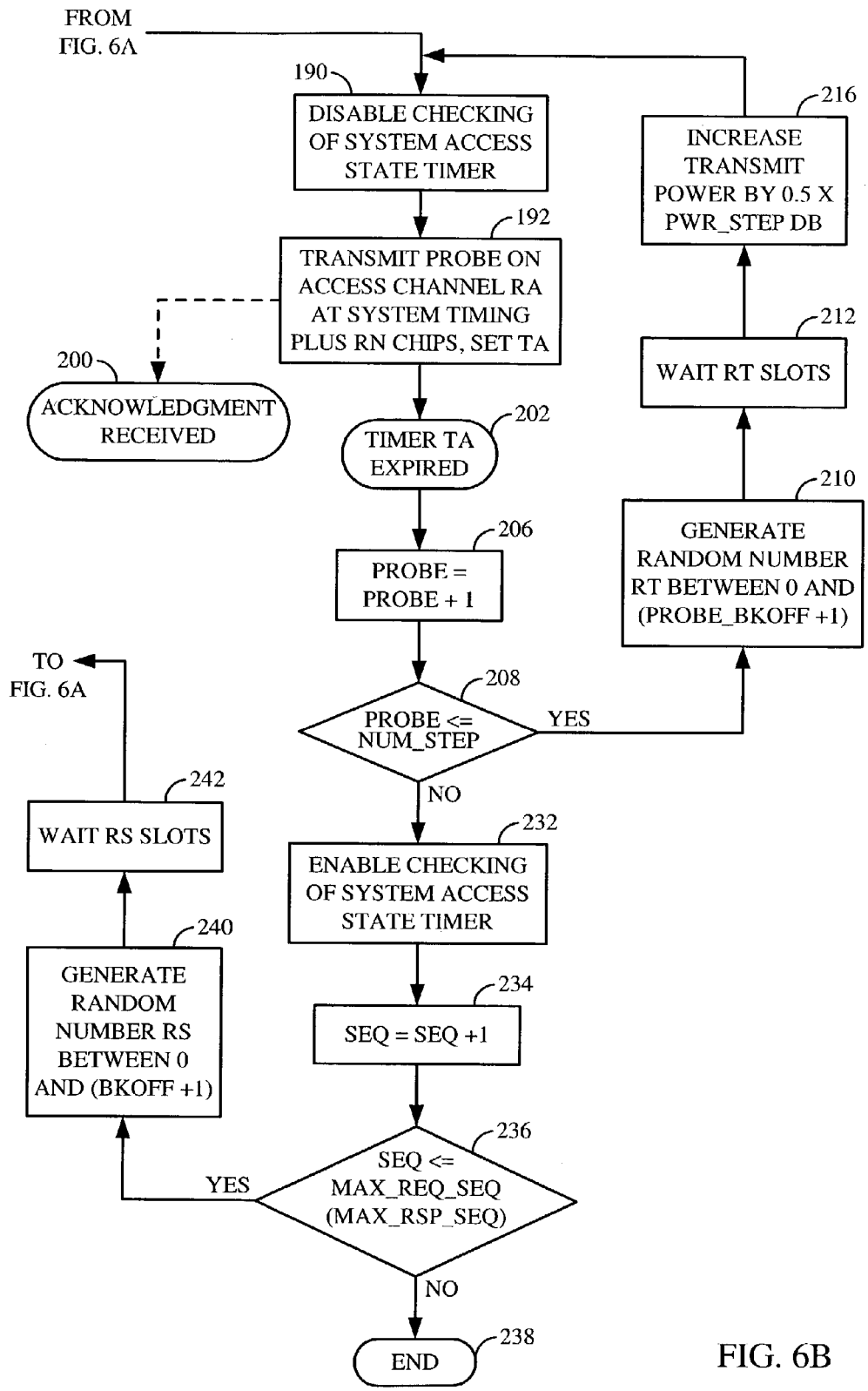

In FIG. 5, a mobile station processor 100 executes the steps shown in FIG. 6 beginning at step 102 in an attempt to communicate with a base station (not shown). The process may be initiated whenever the mobile station (not shown) must send information to the base station. For example, a user may initiate a telephone call, which must be routed to the base station. The mobile station attempts to communicate by transmitting one or more "access probes" 104, 106, 108, 110, 112, 114, 116, 118 and 120 to the base station. An access probe consists of one message and has a maximum duration of one "slot." A slot is a predetermined interval of system time to which the base stations and mobile stations are synchronized in the CDMA cellular telephone system described above. Although the actual slot length is not critical, for purposes of comparing the duration and randomization of access probes to PN randomization, discussed above, it may be on the order of 60 ms. Thus, the PN randomization delay is a very small fraction of a slot.

In an access attempt, the mobile station continues to transmit access probes until one such probe is acknowledged by the base station. Thus, if a collision occurs, the message is not acknowledged, and the mobile station attempts another probe. A predetermined number of access probes is called an "access probe sequence." In FIG. 4, access probe sequence 122 consists of access probes 104, 106, and 108, access probe sequence 124 consists of access probes 110, 112, and 114, and access probe sequence 126 consists of access probes 116, 118, and 120.

The initiation of a call generates initiation signal 128, which is provided to processor 100. At step 130, processor 100 initializes a probe count, PROBE, to zero and an access probe sequence count, SEQ, to zero. At step 132, processor 100 computes the hash function described above to obtain the PN randomization delay, RN. Processor 100 provides delay signal 134, which corresponds to RN, to timing generator 136. Processor 100 provides the message data 138 to an encoder 140, which encodes it as described in the above-referenced U.S. Patents. The encoded message data 142 is modulated with a PN long code 144, which is generated by a PN long code sequence generator 146. As discussed above, the particular PN long code 144 that is generated corresponds to the access channel to be used. This modulation is described in the above-referenced U.S. Patents. Although Exclusive-OR function 152 is shown for performing the modulation, any equivalent structure as known in communications arts, such as a multiplier, may be used. Finally, in response to delay signal 134, timing generator 136 provides timing signals 156 and 158 to these elements, which ultimately delays the transmitted signal 164.

At step 162, processor 100 determines whether the mobile station is attempting to respond to a communication from the base station or whether it is attempting to initiate a request for communication with the base station. A call initiated by a user is an example of a request attempt rather than a response attempt. If, as in FIG. 4, a request attempt is required, processor 100 proceeds to step 166. However, if a response attempt were required, the mobile station would perform a backoff randomization at step 168. In a backoff randomization, processor 100 generates a random number, RS, in the range of 0 to BKOFF+1, where BKOFF is a predetermined parameter. Then, at step 170 processor 100 would wait RS slots before proceeding to step 166. Processor 100 can count the slots to delay because it receives a slot count signal 172 from timing generator 136.

At step 166, processor 100 performs the same request/response test discussed above. If a request attempt is required, processor 100 performs a persistence test, which introduces a random delay of one or more slots between successive access probe sequences. In the persistence test, processor 100 generates a random probability, RP, at the beginning of a slot at step 174. A predetermined parameter, P, represents the probability that the next access probe sequence will be performed. At step 176, processor 100 compares P to RP. If RP is less than P, the persistence test passes and processor 100 proceeds to step 178. If the persistence test fails, processor 100 repeats the test immediately before the beginning of the next slot. If processor 100 determines that a response attempt is required rather than a request attempt at step 166, it proceeds to step 178. The persistence test is not necessary during response attempts because, unlike request attempts, the base station can schedule its communications requiring responses such that multiple mobile stations are not likely to respond simultaneously.

Figure 4:
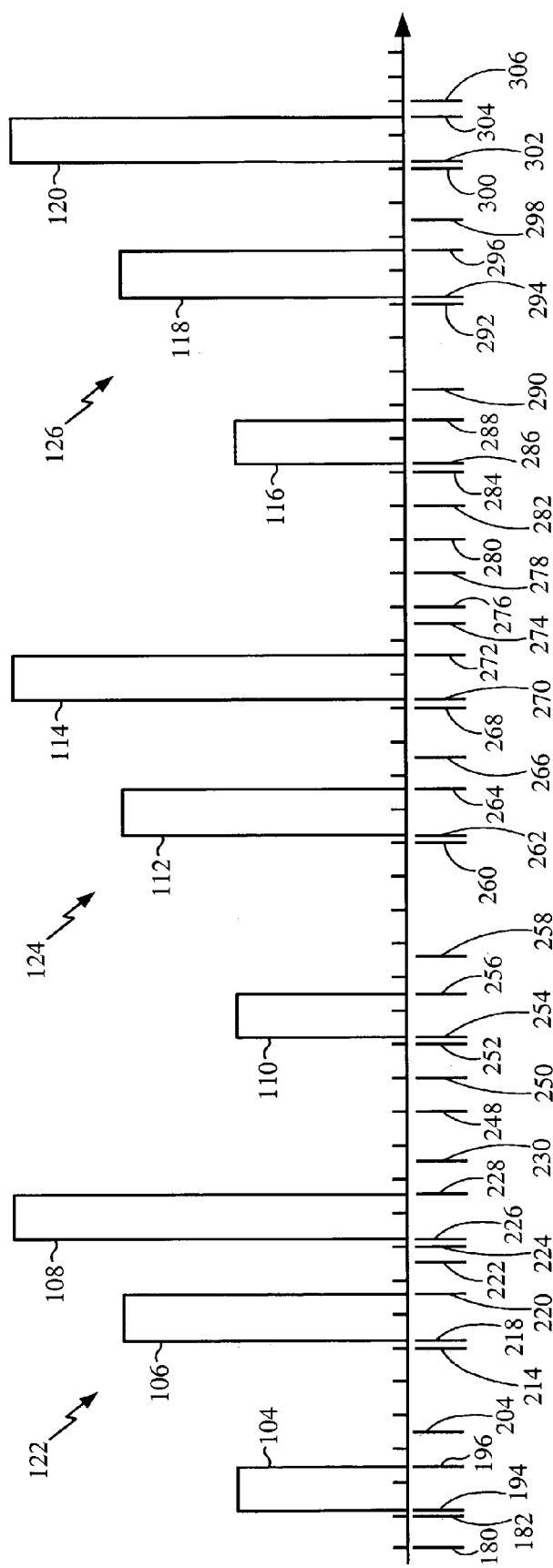
FIG. 4 is a timing diagram showing multiple access probes.

In the example in FIG. 4, which represents a request attempt, processor 100 begins step 174 at the beginning of a slot at time 180. Because the mobile station is attempting a request, it performs the persistence test. The test fails and is performed again immediately before the beginning of the slot at time 182. On this second attempt, the test passes and processor 100 proceeds to step 178.

Processor 100 performs a channel randomization at step 178. It generates a random number RA in the range from zero to ACC_CHAN, which is a predetermined parameter representing the maximum number of access channels. RA corresponds to the access channel on which access probe sequence 122 will be transmitted. Processor 100 provides access channel selection signal 183 to PN code sequence generator 146.

At step 184, processor 100 initializes transmit power signal 186 to a predetermined initial level, INIT_PWR, which is provided to the power transmitter 188 in FIG. 5. In a CDMA cellular communications system or any spread-spectrum communications system, it is important to minimize the level of background noise, which is determined largely by the combined signals of many transmitters. A low level of background noise enables a receiver to more easily extract the desired spread-spectrum signal from the noise. To minimize the noise level, the present invention minimizes the power at which each mobile station transmits. INIT_PWR is set to a value that is below the level typically required for the base station to receive the message. Processor 100 preferably estimates INIT_PWR using measured power levels of signals previously or currently received from the base station. Although the receiver portion of the mobile station is not shown, it is described in one or more of the above-referenced U.S. Patents.

At step 190, processor 100 disables the system access state timer (not shown), which may be used to provide processor 100 with an indication that the mobile station has not received a message it is expecting from the base station within a predetermined timeout period. Such a timer must be disabled during access attempts.

At step 192, the message is transmitted in access probe 104 on the selected access channel, RA. As shown in FIG. 4, the PN randomization further delays the beginning of access probe 104 to time 194, which occurs RN chips after time 182. This delay, which is much less than a 60 ms slot, is greatly exaggerated in FIG. 4 for the purpose of clarity. The height of access probe 104 represents its relative power level. At the end of the transmission of access probe 104 at time 196, processor 100 starts an internal acknowledgement timeout timer, TA. A predetermined timeout parameter, ACC_TMO, indicates the length of time that processor 100 must wait for an acknowledgement to probe 104. If processor 100 receives an acknowledgement signal 198 within the timeout period, it proceeds to step 200 and ceases the access channel request attempt. It may then perform other actions that are not the subject of the present invention. When a time period of ACC_TMO has elapsed without processor 100 having received an acknowledgement, it proceeds to step 202. In FIG. 4, timer TA expires at time 204.

At step 206, processor 100 increments PROBE, the value of its internal probe counter. At step 208 it compares PROBE to NUM_STEP, which is a predetermined parameter that indicates the number of access probes to be performed in each access probe sequence if no acknowledgement is received. In FIG. 4, NUM_STEP is three because access probe sequence 122 consists of three access probes 104, 106, and 108. Therefore, processor 100 proceeds to step 210.

At step 210, processor 100 begins a probe backoff randomization. A probe backoff randomization is similar to the backoff randomization described above, the difference being that probe backoff randomization is performed between successive access probes of an access probe sequence, while backoff randomization is performed before each access probe sequence. The value of PROBE_BKOFF may or may not be equal to that of BKOFF. At step 210, processor 100 generates a random number, RT, in the range from zero to PROBE_BKOFF+1, which is a predetermined parameter. At step 212, processor 100 waits RT slots. For example, in FIG. 4 RT is "2" and processor 100 waits two slots until the slot beginning at time 214.

At step 216, processor 100 changes transmit power signal 186 to a number that causes power transmitter 188 to increase transmit power by a number of decibels (dB) equal to 0.5 times PWR_STEP, which is a predetermined parameter. Processor 100 then proceeds to step 190 and transmits access probe 106 at an increased power level on the same access channel, RA, at time 218, which is RN chips after the beginning of the slot at time 214. Processor 100 does not receive an acknowledgement within the timeout period from time 220 to time 222. It generates a probe backoff, RT, of "1" and waits one slot at step 212 until the slot beginning at time 224. Access probe 108 is transmitted at a further increased power level on the same access channel, RA, at time 226, which is RN chips after the beginning of the slot at time 224. Because no acknowledgement has been received from the base station by the end of the timeout period at time 230 and NUM_STEP probes have been transmitted, processor 100 proceeds to step 232.

At step 232, processor 100 enables the system access state timer (not shown) and proceeds to step 234. Having completed transmission of access probe sequence 122, processor 100 increments SEQ, the value of its internal access probe sequence counter. At step 236, processor 100 compares SEQ to MAX_REQ_SEQ or MAX_RSP_SEQ, the former being a predetermined parameter for indicating the maximum number of access probe sequences to perform before aborting a request attempt and the latter being a predetermined parameter for indicating the maximum number of access probe sequences to perform before aborting a response attempt. If one of these maxima is reached, processor 100 proceeds to step 238. It may then perform other actions that are not the subject of the present invention.

If the test at step 236 indicates that additional probe sequences are to be performed, processor 100 proceeds to step 240, where it performs a backoff randomization as described above with reference to steps 168 and 170. For example, in FIG. 4 processor 100 at time 230 generates a random number RS of "1" and waits one slot at step 242 until the slot beginning at time 248. Processor 100 then returns to step 166 to begin access probe sequence 124.

Processor 100 performs the steps for producing access probe sequence 124 in a like manner to those for producing access probe sequence 122. If, as in the present example, a request attempt is required, processor 100 performs a persistence test at step 174 immediately before the slot beginning at time 248. The test fails and is repeated immediately before the slot beginning at time 250. This second test fails and is repeated immediately before the slot beginning at time 252. The third test passes and processor 100 proceeds to step 178.

Processor 100 performs a channel randomization at step 178. Because processor 100 randomly selects an access channel at the beginning of each access probe sequence, the access channel on which access probe sequence 124 is to be transmitted may not be the same as that on which access probe sequence 122 was transmitted. At step 184, processor 100 initializes transmit power signal 186, and at step 190 processor 100 disables the system access state timer.

At step 192, the message is transmitted in access probe 110, further delayed to time 254 from the slot beginning at time 252 by the PN randomization. Processor 100 proceeds to step 202 after the timeout period has elapsed at time 258 without having received acknowledgement signal 198.

In the probe backoff randomization at step 210, processor 100 produces a random number RT of "3" and processor 100 waits three slots at step 212 until the slot beginning at time 260. At step 192, processor 100 increases the power of signal 164 and transmits access probe 112 at the increased power level at time 262, which is RN chips after the beginning of the slot at time 260.

Processor 100 proceeds through the above steps a third time because it does not receive acknowledgement signal before the timeout period expires at time 266. It generates a probe backoff of two slots and waits until time 268. Access probe 114 is transmitted at time 270, which is RN chips after time 268. Transmission of access probe 114 without an acknowledgment by the timeout at time 274 completes access probe sequence 124, and processor 100 increments SEQ at step 234. Processor 100 then generates a backoff randomization of "1" at step 240. Processor 100 waits one slot at step 242 until the slot beginning at time 276. Processor 100 then returns to step 166 to begin access probe sequence 126.

If a request attempt is required, processor 100 performs a persistence test at step 174. In the example shown in FIG. 4, the persistence test fails three times before passing before the slot beginning at time 284. In access probe sequence 126, access probe 116 is transmitted at time 286, access probe 118 is transmitted at time 294, and access probe 120 is transmitted at time 302 as described above.

After the mobile station transmits access probe 120 and before the timeout timer has reached ACC_TMO, processor 100 receives acknowledgement signal 198 from the base station at time 306. In response to acknowledgement signal 198, processor 100 proceeds to step 200 and ceases the request attempt.

Although FIG. 4 illustrates a request attempt, a response attempt would be similar. In a response attempt, no persistence test would be performed before access probe 104. Instead, the backoff randomization at steps 168 and 170 would produce a backoff delay before access probe 104. Similarly, no persistence tests would be performed between access probe sequences 122 and 124 and between sequences 124 and 126.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method of reducing message collisions between transmitted messages in a communication network, the method comprising:
   determining whether an access attempt is an access channel request;
   performing a persistence test for an access channel slot if the access attempt is an access channel request; and
   transmitting a first access probe of an access probe sequence in the slot if the persistence test passes.

2. The method of claim 1, wherein the step of performing the persistence test comprises:
   generating a random probability;
   comparing the random probability to a predetermined parameter representing a probability that a subsequent access probe sequence will be performed;
   determining that the persistence test passes if the random probability is less than the predetermined parameter; and
   determining that the persistence test fails if the random probability is not less than the predetermined parameter.

3. The method of claim 1, further comprising:
   if the persistence test fails, repeating the persistence test until the persistence test passes.

4. The method of claim 1, further comprising:
   generating a random number for channel randomization; and
   selecting an access channel for transmitting the first access probe based on the random number.

5. A mobile station apparatus, comprising:
   means for determining whether an access attempt is an access channel request;
   means for performing a persistence test for an access channel slot if the access attempt is an access channel request; and
   means for transmitting a first access probe of an access probe sequence in the slot if the persistence test passes.

6. The apparatus of claim 5, wherein the means for performing the persistence test comprises:
   means for generating a random probability;
   means for comparing the random probability to a predetermined parameter representing a probability that a subsequent access probe sequence will be performed;
   means for determining that the persistence test passes if the random probability is less than the predetermined parameter; and
   means for determining that the persistence test fails if the random probability is not less than the predetermined parameter.

7. The apparatus of claim 5, further comprising:
   means for repeating the persistence test until the persistence test passes.

8. The apparatus of claim 5, further comprising:
   means for generating a random number for channel randomization; and
   means for selecting an access channel for transmitting the first access probe based on the random number.

9. A computer readable medium embodying a method of reducing message collisions between transmitted messages in a communication network, the method comprising:
   determining whether an access attempt is an access channel request;
   performing a persistence test for an access channel slot if the access attempt is an access channel request; and
   transmitting a first access probe of an access probe sequence in the slot if the persistence test passes.

10. The computer readable medium of claim 9, wherein the step of performing the persistence test comprises:
generating a random probability;
comparing the random probability to a predetermined parameter representing a probability that a subsequent access probe sequence will be performed;
determining that the persistence test passes if the random probability is less than the predetermined parameter; and
determining that the persistence test fails if the random probability is not less than the predetermined parameter.

11. The computer readable medium of claim 9, wherein the method further comprising:
if the persistence test fails, repeating the persistence test until the persistence test passes.

12. The computer readable medium of claim 9, wherein the method further comprising:
generating a random number for channel randomization; and
selecting an access channel for transmitting the first access probe based on the random number.

13. A method for reducing message collisions in a communication network which includes first and second stations, comprising:
performing an access attempt prior to establishing communication between the first and second stations;
characterizing the access attempt from the first station to the second station as an access channel request;
characterizing the access attempt from the second station to the first station as a response channel request;
determining whether the access attempt is an access channel request;
performing a persistence test on the access channel if the access attempt is the access channel request;
transmitting a probe from the first station to the second station through the access channel if the persistence test passes; and
forgoing the persistence test on the access channel if the access attempt is the response channel request.

14. The method of claim 13, wherein the step of performing the persistence test comprises:
generating a random probability;
comparing the random probability to a predetermined parameter representing a probability that a subsequent access probe sequence will be performed;
determining that the persistence test passes if the random probability is less than the predetermined parameter; and
determining that the persistence test fails if the random probability is not less than the predetermined parameter.

15. The method of claim 13, further comprising:
if the persistence test fails, repeating the persistence test until the persistence test passes.

16. The method of claim 15, further comprising:
generating a random number for channel randomization; and
selecting an access channel for transmitting the first access probe based on the random number.

17. A mobile station apparatus in a communication network for communication with a base station, comprising:
means for performing an access attempt prior to establishing communication between the mobile station apparatus and the base station;
means for characterizing the access attempt from the mobile station apparatus to the base station as an access channel request;
means for characterizing the access attempt from the base station to the mobile station apparatus as a response channel request;
means for determining whether the access attempt is an access channel request;
means for performing a persistence test on the access channel if the access attempt is the access channel request;
means for transmitting a probe from the mobile station apparatus to the base station through the access channel if the persistence test passes; and
means for forgoing the persistence test on the access channel if the access attempt is the response channel request.

18. The apparatus of claim 17, wherein the means for performing the persistence test comprises:
means for generating a random probability;
means for comparing the random probability to a predetermined parameter representing a probability that a subsequent access probe sequence will be performed;
means for determining that the persistence test passes if the random probability is less than the predetermined parameter; and
means for determining that the persistence test fails if the random probability is not less than the predetermined parameter.

19. The apparatus of claim 17, further comprising:
means for repeating the persistence test until the persistence test passes.

20. The apparatus of claim 17, further comprising:
means for generating a random number for channel randomization; and
means for selecting an access channel for transmitting the first access probe based on the random number.

21. A computer readable medium embodying a method of reducing message collisions between transmitted messages in a communication network which includes first and second stations, the method comprising:
performing an access attempt prior to establishing communication between the first and second stations;
characterizing the access attempt from the first station to the second station as an access channel request;
characterizing the access attempt from the second station to the first station as a response channel request;
determining whether the access attempt is an access channel request;
performing a persistence test on the access channel if the access attempt is the access channel request;
transmitting a probe from the first station to the second station through the access channel if the persistence test passes; and
forgoing the persistence test on the access channel if the access attempt is the response channel request.

22. The computer readable medium of claim 21, wherein the step of performing the persistence test comprises:
generating a random probability;
comparing the random probability to a predetermined parameter representing a probability that a subsequent access probe sequence will be performed;
determining that the persistence test passes if the random probability is less than the predetermined parameter; and
determining that the persistence test fails if the random probability is not less than the predetermined parameter.

23. The computer readable medium of claim 21, wherein the method further comprises:

if the persistence test fails, repeating the persistence test until the persistence test passes.

24. The computer readable medium of claim 21, wherein the method further comprises:

generating a random number for channel randomization; and selecting an access channel for transmitting the first access probe based on the random number.

* * * * *